United States Patent [19]
Mori et al.

[11] 4,376,959
[45] Mar. 15, 1983

[54] ADDRESS SIGNAL GENERATOR FOR PRERECORDED SIGNAL SOURCES

[75] Inventors: Toshinori Mori; Yoshiyuki Tsuchikane; Takashi Matsushige, all of Yokohama, Japan

[73] Assignee: Victor Company of Japan, Limited, Yokohama, Japan

[21] Appl. No.: 188,274

[22] Filed: Sep. 18, 1980

[30] Foreign Application Priority Data

Sep. 18, 1979 [JP] Japan ............................ 54-119615

[51] Int. Cl.³ .................................................. G11B 5/00
[52] U.S. Cl. ..................................... 360/72.2; 360/4.4
[58] Field of Search ....................... 360/72.2, 72.1, 73, 360/74.4

[56] References Cited

U.S. PATENT DOCUMENTS 3,950,782  4/1976  Carey et al. ........................ 360/72.2
4,048,659  9/1977  Fink, Jr. et al. ...................... 360/73

FOREIGN PATENT DOCUMENTS 1372496 10/1974 United Kingdom .
1387286  3/1975 United Kingdom .
1550314  8/1979 United Kingdom .

Primary Examiner—John H. Wolff
Attorney, Agent, or Firm—Lowe, King, Price & Becker

[57] ABSTRACT

Prerecorded audio or video information signals including address data indicating the location of synchronized signals from a plurality of synchronized sources are supplied to a single separation circuit via a switching circuit. The separation circuit, selectively connected to one of the signal sources via the switching circuit, separates the address data from the audio or video information of the connected signal source. A register connected to the separation circuit receives the separated address data which constantly updates the register contents. At least one counter is reset to the contents of the register each time a newly selected signal source is connected to the separation circuit to load the address data of the previously connected signal source into that counter. At regular intervals one binary increment is added to the counter address data so that the counter count value corresponds to the address data of the previously connected signal source. The output of the register is a representation of the address of the signal source that is connected to the separation circuit at any instant of time.

8 Claims, 4 Drawing Figures

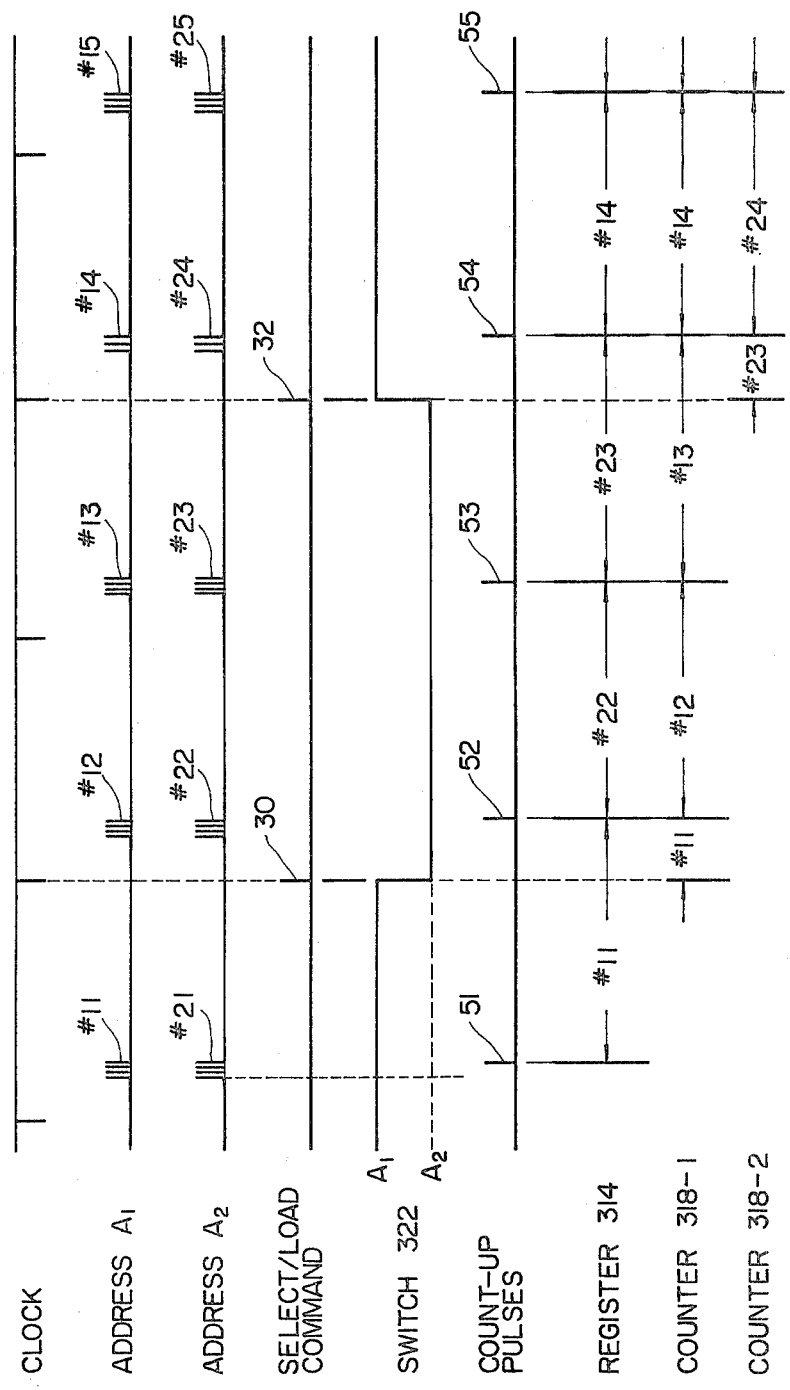

ADDRESS SIGNAL GENERATOR FOR PRERECORDED SIGNAL SOURCES

BACKGROUND OF THE INVENTION

The present invention relates to a circuit arrangement for use with a plurality of synchronized prerecorded signal sources such as video tape or disc recorders.

To edit signals from plural sources of information to produce a single program it is known to record address signals for identifying the storage location of the information data or signals. In most cases the address signals are recorded along the same track of the recording medium together with the information signal. Reproduction of the recorded signals from such plural sources thus requires a costly, complexed processor for each of the signal sources to separate the address signal from the information signal. In cases where the information signal is recorded in a PCM format, each processor must be a PCM processor which is inevitably more costly than analog type processors.

SUMMARY OF THE INVENTION

In accordance with the present invention, a single processor or separation circuit is employed for plural signal sources which are synchronized to a common time base. The separation circuit is selectively connected to one of the signal sources to successively separate the address signals from the information signal of the selected source. A register is connected to receive the separated address signal with which the contents of the register are constantly updated. At least one counter is provided which is reset to the register contents in response to the separation circuit being connected to a newly selected signal so that the counter is loaded with the address signal of the previously connected signal source. At regular intervals the counter is updated by one binary increment so that its count value represents the address location of the signal of the previously connected signal source. The output of the register, which is a representation of an address location of signals derived from the signal source connected to the separation circuit at any instant of time, is utilized in an external circuit for the purposes of searching a desired material of an edited program formed by the successively selected information signals. The output of the counter is also supplied to the external circuit for locating material which is being reproduced in the signal source not connected to the separation circuit at any instant of time.

In one embodiment, a plurality of counters are provided, each corresponding to a separate signal source. Each counter is reset to the output of the register in response to the separation circuit being switched to a newly selected signal source so that the counter is loaded with the address signal of the corresponding signal source which is now disconnected from the separation circuit. Once loaded with the register output, each counter is subsequently updated by one binary increment at regular intervals so that the count value stored therein represents the instantaneous address location of the corresponding signal source.

The information signal may be a PCM audio signal which is recorded in a synchronized frame format similar to conventional video signal format. A decoder may be included in the separation circuit or in any other circuit external thereto for converting the PCM signal into analog form. In the case of composite video signal, a processing circuit may be included in the separation circuit or in any other circuit external thereto. In any event, the system of the present invention requires only one such costly equipment.

BRIEF DESCRIPTION OF THE DRAWINGS

The invention will be further described by way of example with reference to the accompanying drawings, in which:

FIG. 4 is an illustration of a timing diagram associated with the embodiment of FIG. 3.

DETAILED DESCRIPTION

Figure 1:
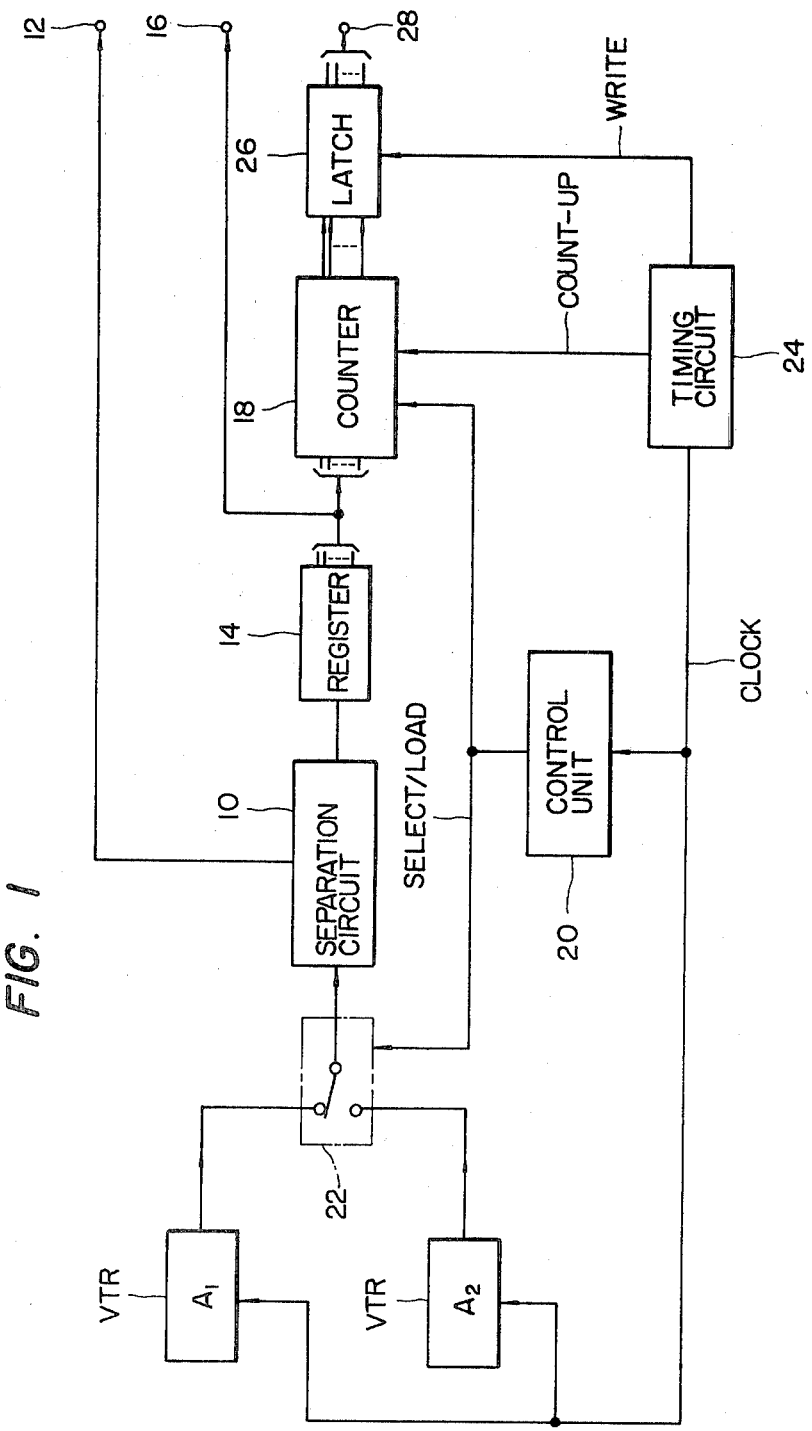
FIG. 1 is an illustration of a first embodiment of the invention.

Referring now to FIG. 1, there is shown a first embodiment of the present invention. The embodiment comprises a separation circuit or video processor 10 which processes an input signal applied selectively from two video tape recorders $A_1$ and $A_2$ so that video frame signal is separated from the address signal which has been inserted in a predetermined horizontal scan period within the frame of the video signal. The separated video signal is delivered to an output terminal 12, the address signal being applied to a register 14. This register is constantly updated with each address data derived by the separation circuit 10 and the output of register 14 is available at a terminal 16. A counter 18 receives its input from register 14 when enabled in response to a loading command signal supplied from a control unit 20. This loading command signal is also applied to a switch 22 to control its switching path. A timing circuit 24 supplies reference clock pulses to video tape recorders $A_1$, $A_2$ and to control unit 20. This clock pulse is synchronized with the vertical synchronization pulse of each video signal source.

Figure 2:
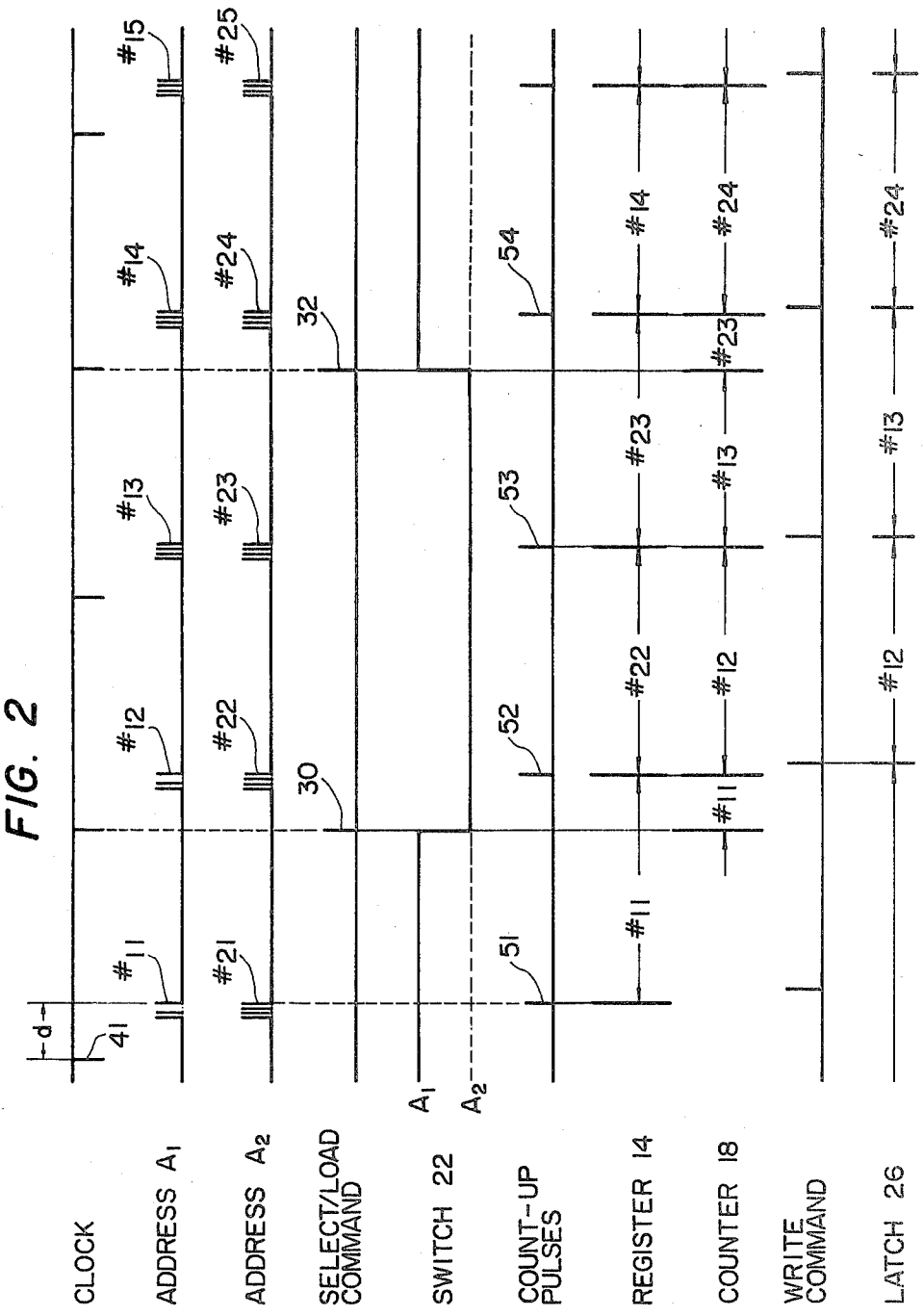
FIG. 2 is an illustration of a timing diagram associated with the embodiment of FIG. 1.

The operation of the FIG. 1 embodiment is described with reference to a timing diagram illustrated in FIG. 2. It is assumed that VTR $A_1$ is initially coupled to separation circuit 10 and switch 22 is operated in response to a select command pulse 30 to connect the system to VTR $A_2$. A subsequent select command pulse is generated at 32 to return the connection to VTR $A_1$. Address data derived from VTR $A_1$ is designated #11 to #15 and address data derived from VTR $A_2$ is designated #21 to #25 for five frames of the video signals.

Timing circuit 24 also generates count-up pulses that are synchronized with the clock pulses, so the count-up pulses occur immediately following a delay period d. Counter 18 responds to each count-up pulse to increase the count value or address location stored therein by one. In response to a clock pulse 41, address data #11 and #21 are generated in VTRs $A_1$ and $A_2$, respectively; since VTR $A_1$ is connected to separation circuit 10 at this instant, register 14 is loaded with the address data #11. This address data is instantly fed to terminal 16 to be utilized by a utilization circuit, not shown. In response to the loading command pulse 30, the contents of register 14 are transferred to counter 18 which is subsequently counted up in response to a count-up pulse 52. The contents of counter 18 are thus changed to address data #12.

Following the system being switched to VTR $A_2$, count-up pulse 52 is generated, and register 14 is loaded with the address data #22. Subsequently, register 14 is loaded with the next address data #23 and counter 18 is increased in response to a count-up pulse 53, as illustrated. In response to command pulse 32 the address data #23 now stored in register 14 is transferred to counter 18 to replace the address data #13 and subsequently incremented by a count-up pulse 54. Since the system has been switched to VTR $A_1$, the address data #14 is loaded into register 14 and available at terminal 16.

A latch 26 is preferably provided, which, when latched in response to a write command pulse generated in control unit 24 following each count-up pulse, receives the address data stored in counter 18. Thus, the contents of latching circuit 26 correspond to the address data of the VTR which is not connected to separation circuit 10 and available at a terminal 28, while the address data of the VTR which is connected to the separation circuit is available at terminal 16.

Figure 3:
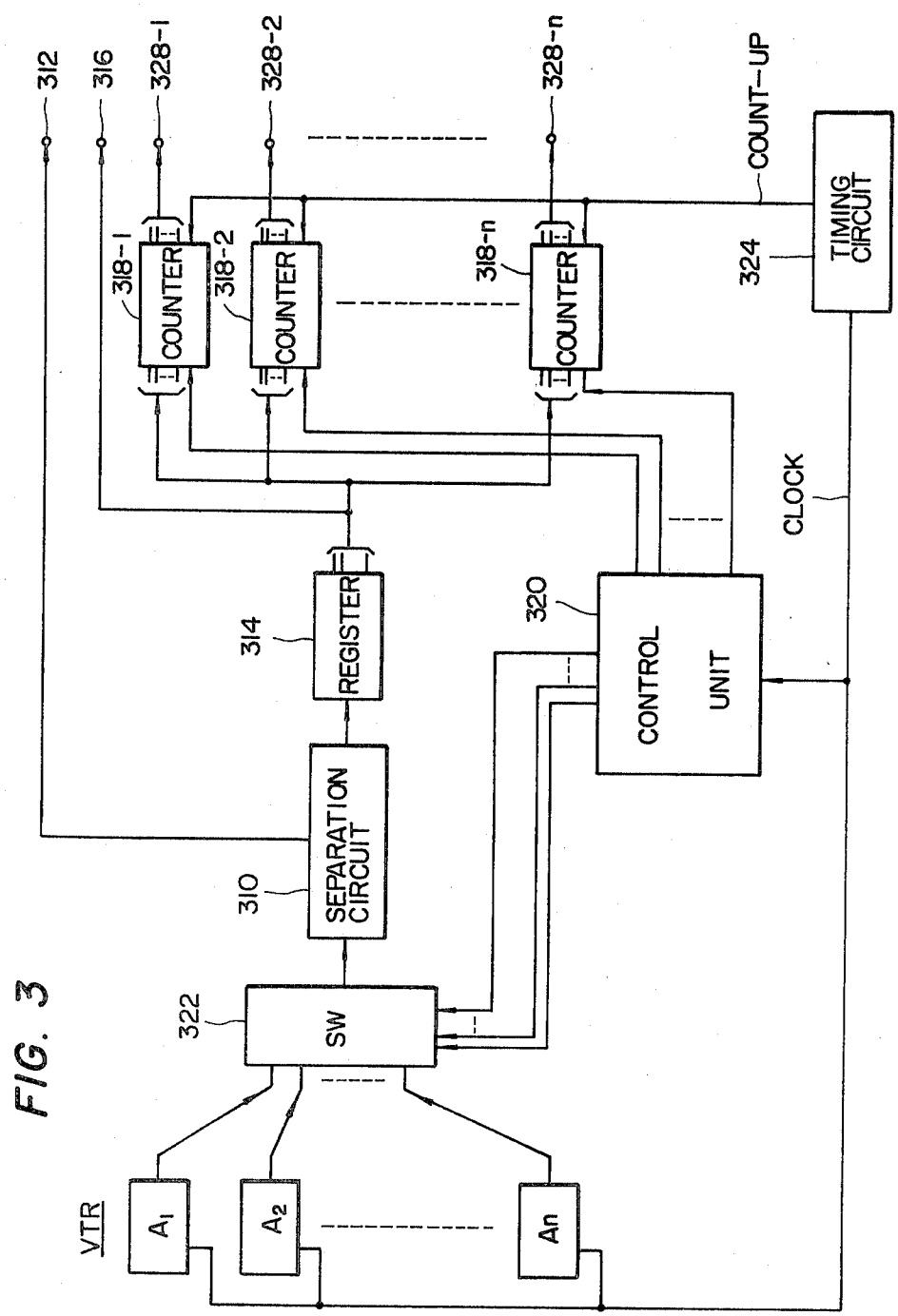
FIG. 3 is an illustration of a second embodiment of the invention.

FIG. 3 is an illustration of an alternative embodiment of the invention in which a plurality of video tape recorders $A_1$ to $A_n$ are respectively associated with a plurality of counters and in which elements corresponding to like elements in FIG. 1 are numbered with corresponding numerals preceded by figure number. Control unit 320 generates a loading command pulse which is selectively applied to counters 318-1 to 318-n so that the selected counter corresponds to a VTR which is selected by switch 322 in response to a binary select signal supplied thereto from control unit 320.

The operation of the FIG. 3 embodiment is described with reference to a timing diagram shown in FIG. 4 in which address data are illustrated only with respect to addresses derived from VTRs $A_1$ and $A_2$ and these VTRs are switched in a similar manner to that shown in FIG. 2. As seen in FIG. 4, the contents of register 314 are updated with the address data derived from the VTR which is connected to separation circuit 310 in the same manner as in the FIG. 1 embodiment. While VTR $A_1$ is switched to separation circuit 310 in the initial stage of operation, counter 318-1 is enabled by control unit 320 in response to a loading command pulse 30 so that the address data #11 is loaded into counter 318-1 which is subsequently updated by one count successively in response to count-up pulses 52 to 55. Upon switching to VTR $A_2$ in response to a command pulse 32, counter 318-2 is loaded with the address data #23 which is updated by "1" count successively in response to count-up pulses 54 and 55. Because of the one-to-one correspondence between VTRs $A_1$-$A_n$ and counters 318-1 to 318-n, the contents of each counter, once loaded with an address data, are subsequently incremented thereafter, instead of being replaced with the data in register 314 as in the previous embodiment, and are available from output terminals 328-1 to 328-n respectively connected to the outputs of counters 318-1 to 318-n.

What is claimed is:

1. A circuit arrangement for use with a plurality of synchronized sources of prerecorded signals including information data which occur synchronously with a common time base in the plural synchronized sources and address data indicating the location of said information data with respect to time, comprising:
    means for separating said address data from said information data to derive an address signal;
    means for selectively connecting a selected one of said signal sources to said separating means;
    a register responsive to the separated address signal;
    at least one binary counter responsive to the separated address signal in the register to be set to a count value commensurate with the separated address signal in said register following the establishment of each connection of the selected signal sources to said separating means; and
    means for changing said count value by one binary count at regular intervals in synchronism with the generation of said address data.

2. A circuit arrangement as claimed in claim 1, wherein a plurality of said binary counters are provided corresponding to said signal sources, said counters being selectively enabled to be responsive to the separated address signals in the register to be set in correspondence with a previously connected signal source following the establishment of each connection of each selected signal source to said separating means so each enabled counter is loaded with a count corresponding to the address of the signal source most recently connected to the separation circuit, said count value being varied by one binary count at said regular intervals.

3. A circuit arrangement as claimed in claim 1 or 2, further comprising a first output terminal from which said separated information signals are available for an external circuit and a second output terminal from which said separated address signals are available for said external circuit.

4. A circuit arrangement as claimed in claim 3, wherein said second output terminal is connected to the output of said register.

5. A circuit arrangement as claimed in claim 1 or 2, wherein said address signal is synchronized with said common time base.

6. Apparatus for keeping track of address locations of plural synchronized sources of prerecorded signals including information data which occur synchronously with a common time base in the plural synchronized sources and address data indicating the location of said information data with respect to time, comprising:
    means for separating said address data from said information data to derive an address signal;
    means for selectively connecting a selected one of said signal sources to said separating means so that address signals of the several sources are sequentially derived from the means for separating;
    counter means responsive to the address signal, said counter means being loaded with a new count each time a different source is connected to the separating means, the new count being indicative of the address of the different source; and
    means for changing the count of the counter means by one binary count at regular intervals in synchronism with the generation of said address data.

7. The apparatus of claim 6 wherein the counter means includes a single counter and the plurality is equal to two, memory means responsive to the count in the counter, and means for activating the single counter and the memory means so the single counter stores an indication of the correct address of the source connected to the means for separating while the memory means stores an indication of the last address coupled by the other source to the means for separating.

8. The apparatus of claim 6 wherein the counter means includes plural counters, one for each source, the counter corresponding with each source being loaded with a new count each time the corresponding source is connected to the separating means, the new count being indicative of the address of the corresponding source, and means for changing the count of each counter by one binary count at regular intervals in synchronism with the generation of said address data.

* * * * *